Oct. 8, 1968     T. A. GARDY     3,404,652

FOUL-PROOF ANCHOR

Filed April 21, 1967     2 Sheets-Sheet 1

Oct. 8, 1968
T. A. GARDY
3,404,652
FOUL-PROOF ANCHOR
Filed April 21, 1967
2 Sheets-Sheet 2
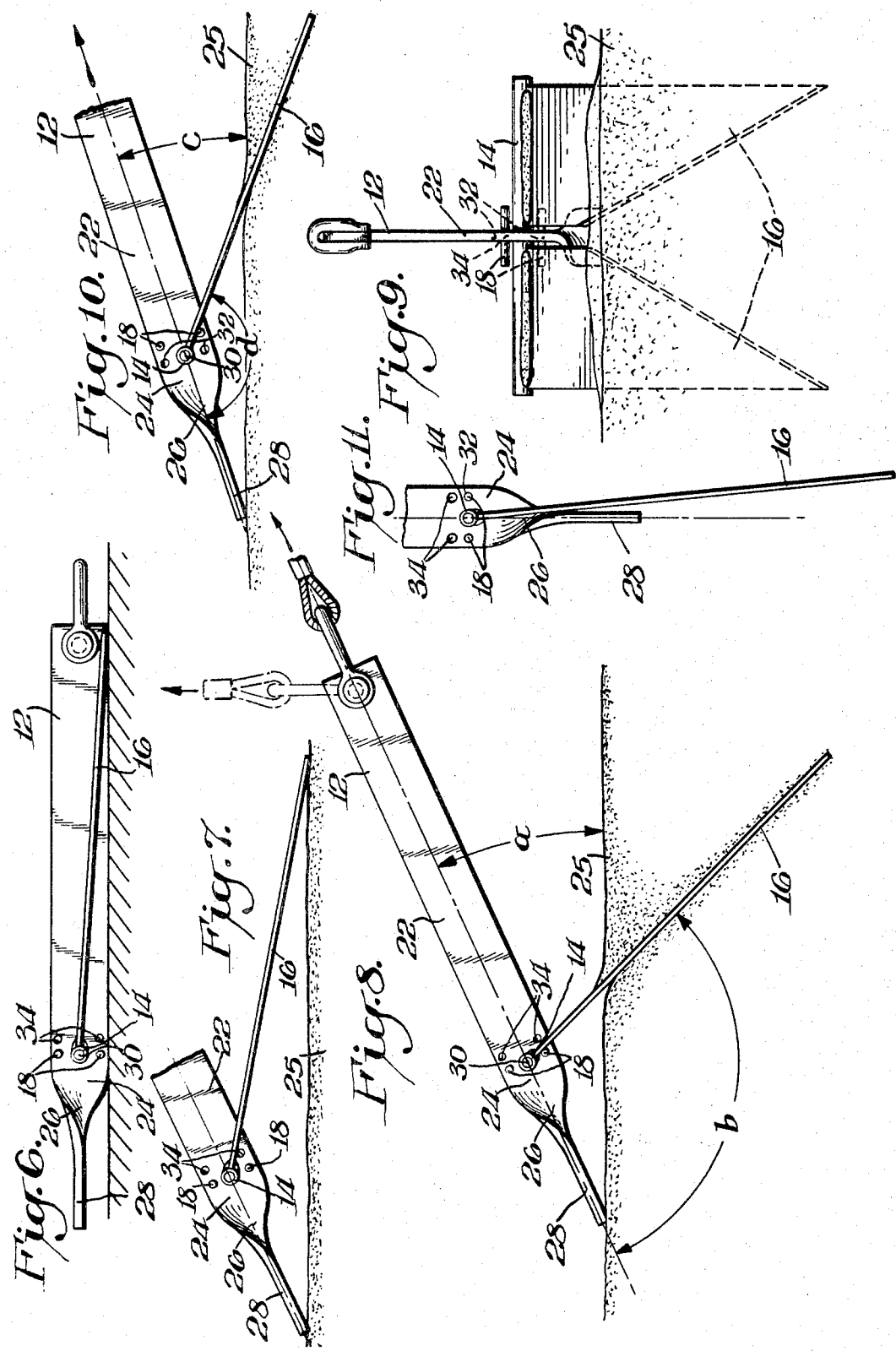

United States Patent Office 3,404,652
Patented Oct. 8, 1968

3,404,652
FOUL-PROOF ANCHOR
Thomas A. Gardy, 95 Ritter Lane, Newark, Del. 19711
Filed Apr. 21, 1967, Ser. No. 632,620
9 Claims. (Cl. 114—208)

ABSTRACT OF THE DISCLOSURE

The foul-proof anchor includes a pivot rod secured between the ends of an elongated shank with a pair of flukes mounted on the pivot rod on opposite sides of the shank. One portion of the shank, from the pivot rod to its end, is considered a force arm and the remaining portion, a lever arm. Limit pins, which are constructed as shear pins, are secured to the shank for controlling the angular movement of the flukes. The lever arm is so proportioned with respect to the length of the flukes as to act as a brake for preventing the flukes from reacting against the shear pins until a substantially vertical force is applied to the force arm.

Background of the invention

With the increasing use of water craft, there is a growing need for an anchor which is both effective in use and low in cost. Many attempts have been made to provide such an anchor by forming the fluke limit pins as shear pins to prevent the anchor from fouling. Some attempts are described, for example, in U.S. Patents 2,789,526; 3,057,318; 2,990,799; 2,711,150; 2,746,414; and 1,147,799. These various attempts at preventing a simple foul-proof anchor still lack an anchor which can be made simply and cheaply and can be easily stored without adversely effecting its intended foul-proof operation.

Brief description of invention

An object of this invention is to provide such a foul-proof anchor which fulfills the needs indicated above.

A further object of this invention is to provide a foul-proof anchor incorporating shear pins which are broken only when a substantially vertical force is applied to the anchor.

In accordance with this invention, a pair of flukes are mounted on a pivot rod on opposite sides of an elongated shank with shear pins extending through the shank to limit the angular movement of the flukes. The base end of the shank (i.e., from the pivot rod to the bottom of the shank) acts as a lever arm which is so proportioned with respect to the flukes as to constitute brake means for preventing the flukes from reacting against the shear pins until a substantially vertical force is applied to the shank.

The foul-proof anchor may also include various advantageous features. For example, two pairs of holes may be provided in the shank for selectively receiving a pair of shear pins in accordance with the water depth. Additionally, the pivot rod may be hollow and filled with a relatively heavy mass to thereby provide a weighted anchor which is still of simple construction. The flukes may be substantially triangularly shaped with the base of each triangle attached to the pivot rod and with the flukes tapering away from the shank to provide a pair of spaced digging points remote from the shank. Conveniently, the shank may be made of singular, flat bar, which is twisted 90° between the pivot rod and the end of the lever arm. In this manner, the shear pins can be inserted through the wide side having a narrow thickness while the wide side would then act as an elongated, flattened fulcrum at the end of the lever arm. By twisting the shank as indicated above, the twisted portion of the lever arm may be disposed in the path of motion of the flukes to act as a stop means for the flukes after the shear pins have been broken and during the retrieval of the anchor. Advantageously, the flukes may be about two and a half times as long as the lever arm and may be substantially as long as the force arm (i.e., the remaining portion of the shank). During the stored condition of the anchor, the flukes are substantially parallel with the shank to provide a compact storage unit which is only as thick as the wide side of the shank.

Brief description of drawings

FIG. 6 is an elevation view of the anchor shown in FIGS. 4–5 during the storage condition;

FIGS. 7–8 are side elevation views of the anchor shown in FIGS. 4–6 during different phases of operation;

FIG. 9 is a rear elevation view of the anchor shown in FIG. 8;

FIG. 10 is a side elevation view similar to FIG. 8 in an alternative method of use; and FIG. 11 is a side elevation view showing the anchor of FIGS. 1–10 during retrieval.

Detailed description

Figure 4:
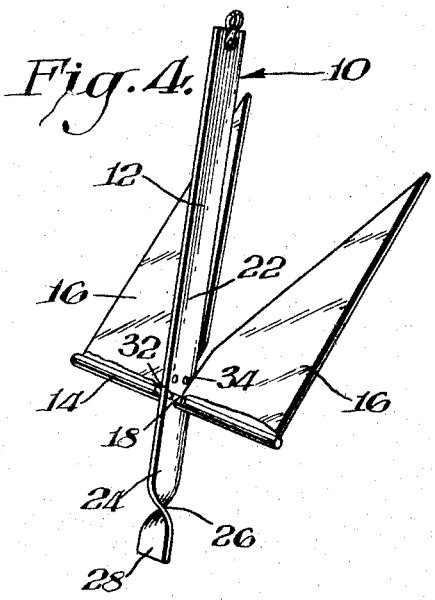
FIG. 4 is a perspective view of an anchor similar to that shown in FIGS. 1–3.

As indicated in FIG. 4, anchor 10 includes an elongated shank 12 having a pivot rod 14 and a pair of flukes 16, 16. A pair of shear pins 18 (only one shown in FIG. 4) extend through shank 12 adjacent to flukes 16.

Figure 5:
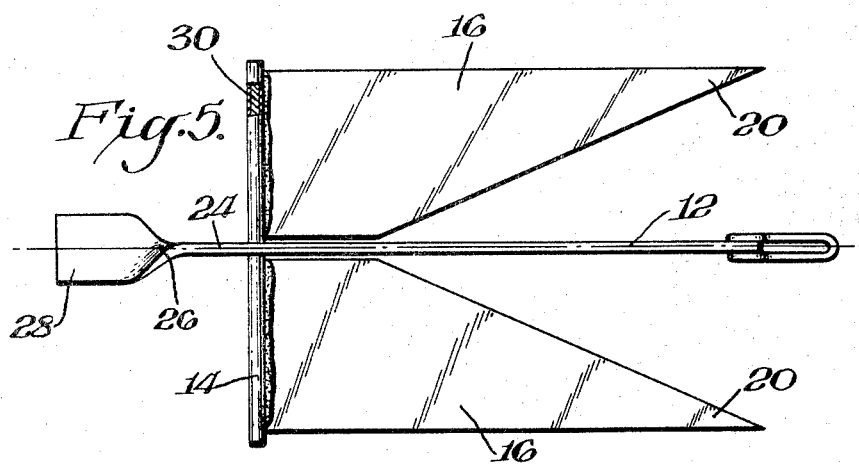
FIG. 5 is a plan view of the anchor shown in FIG. 4.

As more clearly shown in FIG. 5, flukes 16 are substantially triangularly shaped with the base of each triangle secured by welding or other suitable means to pivot rod 14. The flukes then taper outwardly away from shank 12 to provide a pair of spaced digging points 20 disposed remote from the shank. These spaced digging points increase the digging action of the anchor since the digging action is not confined to a concentrated area. Shank 12 may be considered as comprising a force arm 22 and a lever arm 24 with the pivot rod 14 separting both arms. Shank 12 is made in a simple manner by twisting a flat bar at a location 26 intermediate between the ends of lever arm 24. In this manner, the flat edge 28 of lever arm 24 acts as an elongated fulcrum, which because of its elongated length, minimizes its tendency to dig in the river bed or sea floor 25.

Forming shank 12 as a twisted bar not only provides an elongated, flattened fulcrum 28, but also, disposes the narrow thickness of shaft 21 so that pivot rod 14 and shear pins 18 can be inserted through this narrow thickness.

Anchor 10 is conveniently made quite heavy for its size by forming pivot rod 14 as a hollow shaft which is then filled with a relatively heavy mass 30 (FIG. 5).

As shown in various figures, shank 12 includes two pairs of holes 32, 34. Thus, the shear pins may be inserted in either pair of holes in accordance with the water depth and the desired ratio of rope length to water depth. Additionally, in this manner, the shear pins are exposed so that new shear pins may be conveniently inserted and the stubs of the old shear pins removed when the old shear pins are broken.

The various elements of anchor 10 are so proportioned to maximize the foul-proof effectiveness of the anchor. For example, flukes 16 are approximately two and one half times as long as lever arm 24 and are substantially as long as force arm 22. In this manner, as later described, the flukes are prevented from reacting against the shear pins and thus breaking them until a substantially vertical force is applied to the force arm 22. Additionally, as shown in FIG. 6, the anchor forms a compact storage unit, which is no thicker than the width of the wide side of shank 12 and the pointed flukes do not extend beyond shank 12.

The operation of anchor 10 is as follows: After selecting the proper ratio between rope 36 and the water depth, shear pins 18 are inserted in either holes 32 or holes 34. For example, with deep water, such as greater than ten feet, a rope to depth ratio of three to one is used, while for shallow water, a ratio of four to one is used. For deep water, shear pins 18 would be inserted in lower holes 32 and for shallow water, shear pins 18 would be inserted in upper holes 34. The location of the shear pins controls the angular movement of the flukes 16 with the respect to the sea floor 25 and lever arm. Thus, for shallow water (FIG. 10) a greater angle is permitted between flukes 16 and lever arm 24; and the angle between the lever arm 24 and the sea floor 25 is smaller than the corresponding angle with deeper water (FIG. 8). Additionally, of course, with deeper water there is a smaller angle permitted between lever arm 24 and flukes 16.

Figure 1:
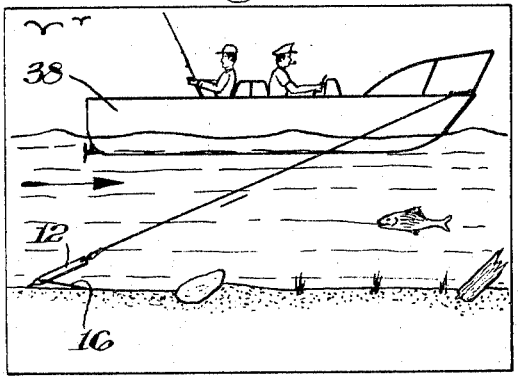
FIG. 1 is an elevation view of an anchor in accordance with this invention during one stage of operation.

After shear pins 18 have been inserted, the anchor is dropped into the water and rests upon the sea floor 25 as shown, for example, in FIGS. 1 and 7. As the boat drifts, dragging anchor 10 along the sea floor 25, flukes 16 dig into sea floor 25 until the anchor eventually assumes the position shown in FIG. 8. In this position, flukes 16 are prevented from further relative rotational movement by shear pins 18, which are sufficiently strong to act as limit pins. For example, pins 18 may be made of polyethylene high density rod which is sufficiently flexible to give or yield slightly before breaking. The pins can be cut by the user from rods commercially available at hardware stores. Thus, the only part of anchor 10 needing replacement can be conveniently purchased at low cost and cut to size by the user. Other suitable materials for pins 18 are various fiber rods, or aluminum or copper rods. Because the force on rope 36 is applied at the same angle as the lever arm, the force through force arm 22 is not sufficient to cause the shear pins 18 to break. This is insured by proportioning the lever arm 24 with respect to the length of flukes 16 as to control or limit the various angles that the anchor may assume and thereby prevent too great a vertical component of force from being applied.

Figure 2:
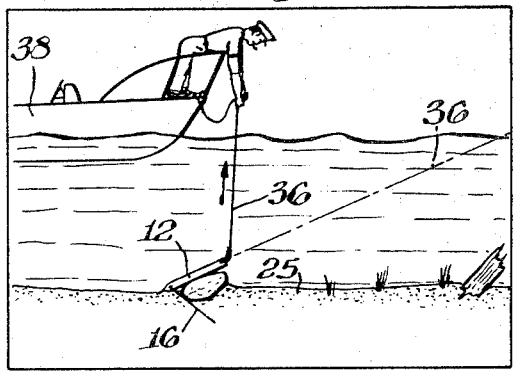
FIGS. 2–3 are elevation views similar to FIG. 1 during different stages of operation.

If the anchor should be fouled as shown, for example, in FIG. 2; or, if it is otherwise desired to remove the anchor, force is applied by the user to rope 36 and when the boat 38 is substantially directly above the anchor, there is a sufficient vertical component of force to cause the anchor to pivot about fulcrum 28 so that the dug flukes break the shear pins to permit anchor 10 to be easily retrieved.

Figure 3:
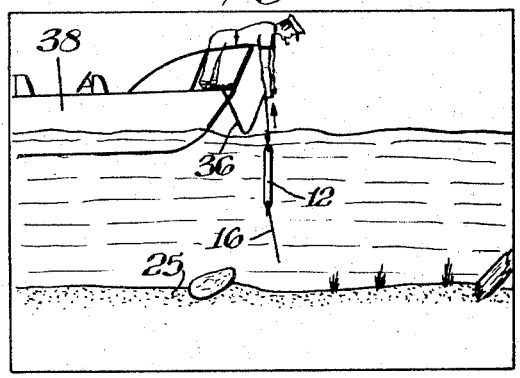

After the shear pins 18 have been broken, the anchor is retrieved as shown, for example, in FIGS. 3 and 11. During retrieval, the twisted portion at the remote end of lever arm 24 acts as a pair of stops to maintain the flukes substantially aligned with shank 12.

Various materials are suitable for the elements comprising anchor 10. For example, mass 30 may be lead weights; and the other parts may be made from suitable metals or plastics.

What is claimed is:

1. A foul-proof anchor comprising an elongated shank, a pivot rod secured to said shank intermediate the ends of said shank, a portion of said shank from said pivot rod to an end of said shank being a lever arm and the remaining portion of said shank being a force arm, a pair of flukes mounted on said pivot rod on opposite sides of said shank, two pairs of holes in said shank for selectively receiving a pair of shear pins in accordance with the water depth, exposed limit pins in said holes for controlling the angular movement of said flukes, said limit pins being constructed as shear pins to permit retrieval of said anchor after said flukes are fouled by the breaking of said shear pins, said lever arm being so proportioned with respect to the length of said flukes so as to constitute brake means for preventing said flukes from reacting against said shear pins until a substantially vertical force is applied to said force arm, said lever arm being substantially flat with a pair of substantially parallel wide sides and a pair of substantially parallel narrow sides, said lever arm terminating in a flat edge having a wide edge and a narrow edge, and said wide edge being substantially parallel to said pivot rod.

2. An anchor as set forth in claim 1 wherein said flukes are substantially triangularly shaped, with the base of each triangle attached to said pivot rod, and said flukes tapering outwardly away from said shank to provide a pair of spaced digging points disposed remote from said shank.

3. A foul-proof anchor comprising an elongated shank, a pivot rod secured to said shank intermediate the ends of said shank, a portion of said shank from said pivot rod to an end of said shank being a lever arm and the remaining portion of said shank being a force arm, a pair of flukes mounted on said pivot rod on opposite sides of said shank, holes in said shank, exposed limit pins in said holes for controlling the angular movement of said flukes, said limit pins being constructed as shear pins to permit retrieval of said anchor after said flukes are fouled by the breaking of said shear pins, said lever arm being so proportioned with respect to the length of said flukes so as to constitute brake means for preventing said flukes from reacting against said shear pins until a substantially vertical force is applied to said force arm, said shank being a flat bar rectangular in cross section having a wide side and a narrow side, said pins and said pivot rod being inserted through said wide side, said shank being twisted intermediate the ends of said lever arm with the wide side of the remote end of said lever arm being normal to the wide side of the remainder of said shank whereby said remote end of said lever arm acts as an elongated flattened fulcrum.

4. An anchor as set forth in claim 1 wherein said remote end of said lever arm is in the path of motion of said flukes to act as stop means for said flukes during the retrieval of said anchor.

5. An anchor as set forth in claim 4 wherein said flukes are approximately two and a half times as long as said lever arm.

6. An anchor as set forth in claim 5 wherein said flukes are substantially as long as said force arm.

7. An anchor as set forth in claim 6 wherein said flukes are substantially parallel with said shank and disposed alongside said force arm during the storage condition of said anchor with said wide side of said force arm being the thickest portion of said anchor to provide a compact storage unit.

8. An anchor as set forth in claim 7 wherein said holes are two pair of holes in said wide side of said shank, said shear pins being a pair of pins selectively positioned in a pair of said holes, said pivot rod being hollow and filled with a heavy mass, said flukes being substantially triangularly shaped with the base of each triangle secured to said pivot rod, and said flukes tapering outwardly away from said shank to provide a pair of spaced digging points remote from said shank.

9. An anchor as set forth in claim 1 wherein said force arm is substantially flat with a pair of substantially parallel wide sides and a pair of substantially parallel narrow sides, said wide sides of said force arm being disposed substantially normal to said wide sides of said lever arm, and said pivot rod and said pins being inserted through said wide sides of said force arm substantially parallel to said narrow sides of said force arm.

References Cited

UNITED STATES PATENTS

| | | | |
|---|---|---|---|
| 2,789,526 | 4/1957 | Gollner | 114—208 |
| 2,937,609 | 5/1960 | Cobb | 114—208 |

MILTON BUCHLER, *Primary Examiner.*

TRYGVE M. BLIX, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,652            October 8, 1968

Thomas A. Gardy

It is certified that error appears in the above identified patent and that said Letters Patent are hereby corrected as shown below:

Column 2, line 49, "separting" should read -- separating --. Column 4, line 51, the claim reference numeral "1" should read -- 3 --.

Signed and sealed this 15th day of December 1970.

(SEAL)
Attest:

Edward M. Fletcher, Jr.            WILLIAM E. SCHUYLER, JR.
Attesting Officer                      Commissioner of Patents